United States Patent [19]

Lanciault

[11] 4,434,786
[45] Mar. 6, 1984

[54] ADJUSTABLE SOLAR HEAT COLLECTOR

[76] Inventor: Joseph A. Lanciault, 18 Blossom St., Apt. 2, Fitchburg, Mass. 01402

[21] Appl. No.: 421,965

[22] Filed: Sep. 23, 1982

[51] Int. Cl.³ .............................................. F24J 3/02
[52] U.S. Cl. .................................... 126/424; 126/440; 350/252
[58] Field of Search ............... 126/424, 426, 440, 417, 126/451; 350/245, 252, 255

[56] References Cited

U.S. PATENT DOCUMENTS

| | | | |
|---|---|---|---|
| 1,658,455 | 2/1928 | Metzech et al. | 126/424 |
| 2,259,902 | 10/1941 | McCain | 126/440 |
| 3,991,741 | 11/1976 | Northrup et al. | 350/247 X |
| 4,066,062 | 1/1978 | Houston | 126/424 |
| 4,098,263 | 7/1978 | Lanciault | 126/440 |
| 4,303,057 | 12/1981 | Crandon et al. | 126/440 X |
| 4,334,522 | 6/1982 | Dukess | 126/440 |
| 4,354,348 | 10/1982 | Lee | 126/440 X |

Primary Examiner—Samuel Scott
Assistant Examiner—Margaret A. Focarino
Attorney, Agent, or Firm—Charles R. Fay

[57] ABSTRACT

Adjustable solar heat collector comprising an articulated chain of light condensing lenses for application to a tank, wherein each lens is adjustable toward and away from the tank and on inclination to receive the sun's rays as directly as possible.

4 Claims, 3 Drawing Figures

ADJUSTABLE SOLAR HEAT COLLECTOR

BACKGROUND OF THE INVENTION

Solar heat collectors are a good source of energy preserving heat especially for domestic hot water. These collectors will undoubtedly become more important in the future for all heat development.

One situation in which solar heat collecting is especially convenient and valuable is with mobile homes, trailers, and the like, and whereas the present invention is of use in any situation requiring heat, it is particularly advantageous in such habitations as well as more permanent homes.

Attention is directed to applicant's prior patents: U.S. Pat. No. 3,595,216, July 27, 1971; U.S. Pat. No. 3,823,703, July 16, 1974; U.S. Pat No. 3,973,553, Aug. 10, 1976; and U.S. Pat. No. 4,098,263, July 4, 1978. Some of the novel features in these patents may be combined with the novel features in the present invention for improved efficiency and convenience.

SUMMARY OF THE INVENTION

A water tank for collection of hot water may be placed where desired or convenient, but is particularly efficatious on the roof of a habitation including dwellings, houses, apartment houses, and mobile homes, trailers, motor homes, etc.

In the present case, it is provided with a circumferential chain (or chains) of glass (or plastic) magnifying discs or oblong bars which can be easily draped on the tank. Each disc or bar is mounted in an individual frame or suitable material (metal, plastic, wood) and the frames are mounted on screw rods passing therethrough, each screw rod being engaged in a swivel nut so that by turning individual rods (or nuts), each disc or bar can be adjusted toward and from the surface of the tank, and can also be tilted or inclined to catch the direct rays of the sun to obtain maximum solar heat collecting efficiency for the tank (or other heat collecting enclosure).

The screw rods are mounted individually on bases and these bases are chained together or otherwise arranged in a flexible belt for ease in applying the disc or bars to the exterior of the heat collecting container.

PREFERRED EMBODIMENT OF THE INVENTION

Figure 1:
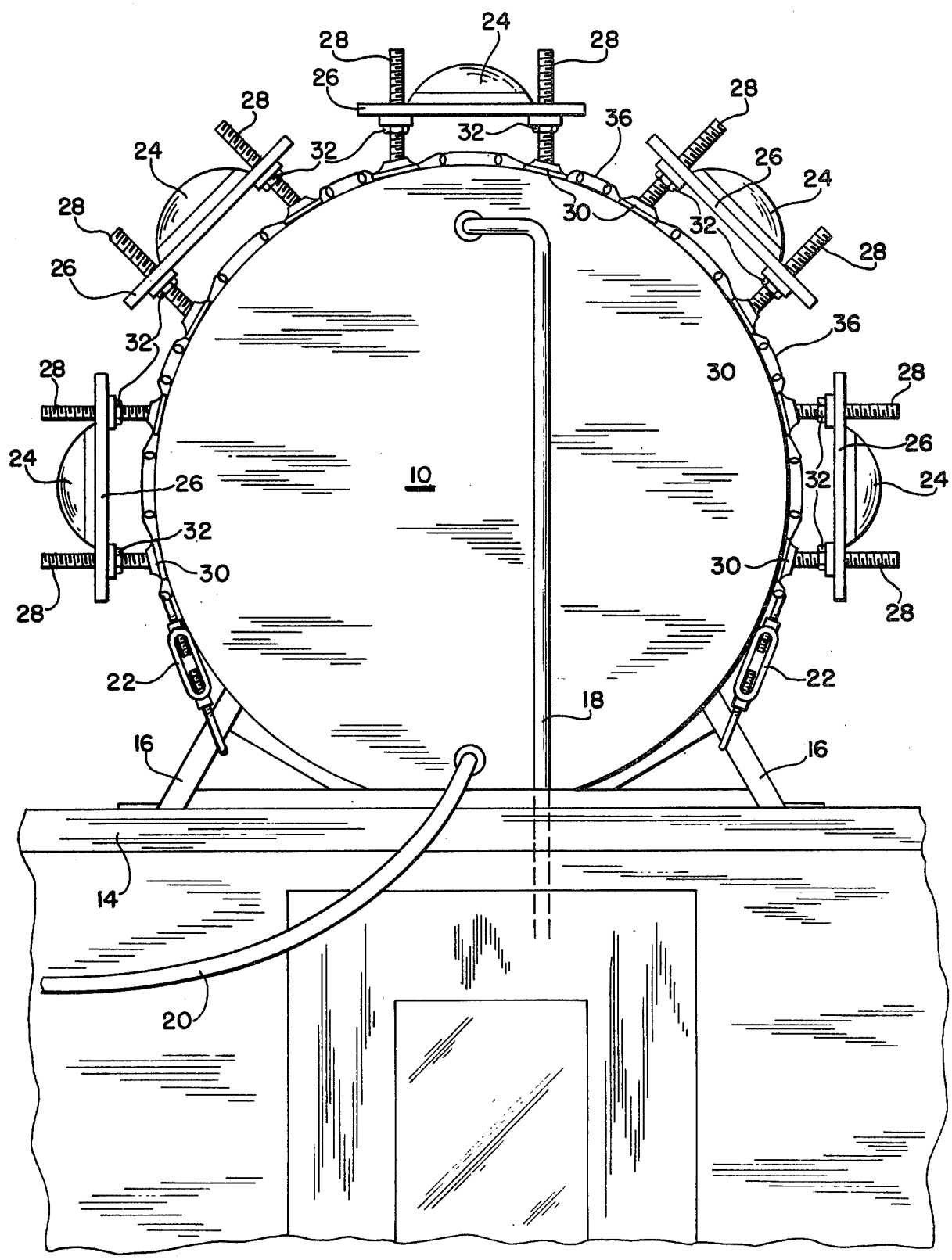
FIG. 1 is an elevational view of the invention as applied to a hot water tank on a roof-top.

The reference number at 10 indicates a tank, reservoir, or the like, which may be secured to the roof 14 as by special brackets or brackets 16. This roof may be of a house, apartment, etc., but is shown herein as the top or roof of a motor home, trailer, etc. It may be e.g. a container for hot water with an outlet pipe 18 and a cold water supply 20. Other appurtenances, e.g. safety and overflow valves and the like may of course be incorporated.

A flexible chain of solar heat accumulators is laid upon the exterior surface of the tank 10, and solar heat heats it up. There may be one or several of the chains, each of which may have tie rods 22 of any suitable nature at the ends thereof to tie down the chain or chains by securement to the brackets 16 or other suitable device.

Figure 2:
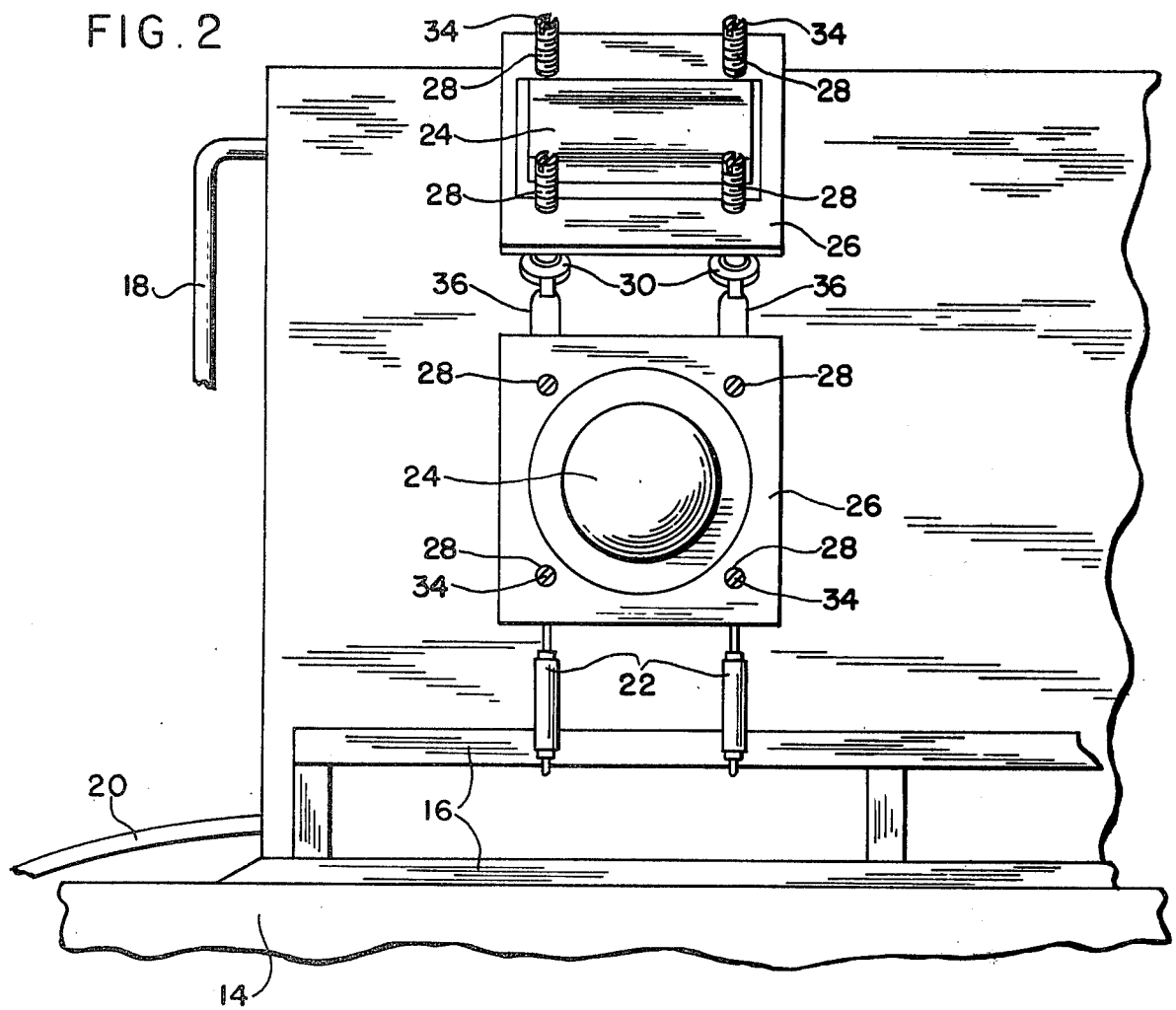
FIG. 2 is a side elevational view of the hot water tank shows an oblong bar configuration of a lens.
Figure 3:
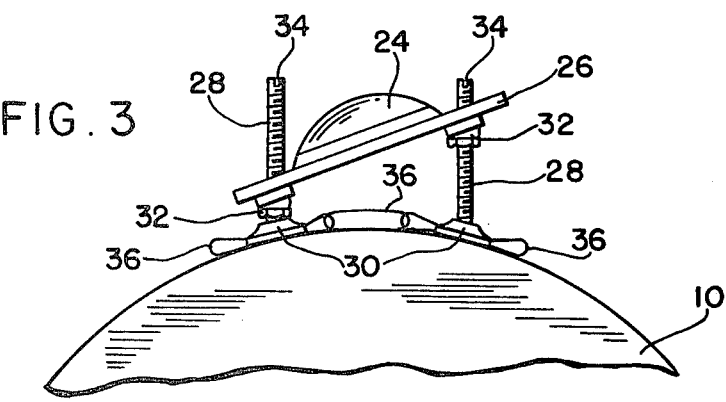
FIG. 3 is a detailed view showing the adjustment of an individual lens.

Each chain comprises a set or series of light condensers or intensifiers, generally indicated at 24, and these concentrate the light and therefore the heat of the sun onto the surface of tank 10 (preferably steel) thereby heating the fluid in the tank. These light (heat) intensifiers may be of any practicable form or configuration, but in general each one is a convex disc, or a convex oblong bar, see FIG. 2, and each heat intensifier 24 is set in a rectangular or square frame 26 of suitable material, e.g. wood, metal, plastic, etc.

Screw rods 28 based in screw rod bases 30 engage swivel nuts 32 in each frame 26, and in the disclosure herein there are shown to be four screw rods for each such frame 26. The nuts can be independently rotated to adjust the frames on the screw rods, or the latter can be rotated with a screw driver working in cross slots 34, see FIG. 2.

By this means, the heat intensifiers 24 are adjustable to and from the surface of the tank 10, and also tilted or slanted for exact alignment with the sun's rays by rotating the screw rods or the nuts. The screw rods have a well-known rotary connection with the screw rod bases.

The various screw rod bases are flexibly connected by any kind of suitable link 36 to complete the chains or bands that are actually free of the tank and can be applied or removed.

I claim:

1. An adjustable solar heat collector comprising a tank for holding a fluid, a chain of separate light condensing members on the tank at the exterior thereof, each member including a lens, a separate frame holding each lens, a plurality of support rods for each frame, each rod being adjustably mounted relative to its frame, a rod base for each rod, means connecting the rod bases to form the chain, means to adjust the frames and lenses on the rods to cause the respective frames to approach or move away from the tank, said means also being selectively operable to tilt the frames with respect to the tank.

2. The solar heat collector of claim 1 including removable means to secure the chain to the tank.

3. The solar heat collector of claim 1 wherein the means connecting the rod bases comprises articulate elements.

4. The solar heat collector of claim 1 wherein the rods are threaded and mesh with nuts on the frames.

* * * * *